United States Patent
McDaniel et al.

(10) Patent No.: US 10,988,557 B2
(45) Date of Patent: *Apr. 27, 2021

(54) METHODS OF PREPARING A CATALYST UTILIZING HYDRATED REAGENTS

(71) Applicant: Chevron Phillips Chemical Company LP, The Woodlands, TX (US)

(72) Inventors: Max P. McDaniel, Bartlesville, OK (US); Kathy S. Clear, Bartlesville, OK (US); Eric D. Schwerdtfeger, Bartlesville, OK (US); Jeremy M. Praetorius, Bartlesville, OK (US)

(73) Assignee: Chevron Phillips Chemical Company LP, The Woodlands, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 17/075,515

(22) Filed: Oct. 20, 2020

(65) Prior Publication Data

US 2021/0047444 A1    Feb. 18, 2021

Related U.S. Application Data

(63) Continuation of application No. 16/863,243, filed on Apr. 30, 2020, now Pat. No. 10,858,460, which is a continuation of application No. 16/387,199, filed on Apr. 17, 2019, now Pat. No. 10,669,362, which is a continuation of application No. 15/816,131, filed on Nov. 17, 2017, now Pat. No. 10,323,109.

(51) Int. Cl.
| | |
|---|---|
| *C08F 110/02* | (2006.01) |
| *B01J 37/02* | (2006.01) |
| *B01J 21/08* | (2006.01) |
| *B01J 23/26* | (2006.01) |
| *C08F 10/02* | (2006.01) |
| *B01J 37/08* | (2006.01) |
| *B01J 31/02* | (2006.01) |
| *B01J 31/04* | (2006.01) |
| *B01J 31/34* | (2006.01) |
| *B01J 31/38* | (2006.01) |
| *B01J 21/06* | (2006.01) |

(52) U.S. Cl.
CPC ............ *C08F 110/02* (2013.01); *B01J 21/08* (2013.01); *B01J 23/26* (2013.01); *B01J 37/0203* (2013.01); *B01J 37/0207* (2013.01); *B01J 37/0209* (2013.01); *B01J 37/086* (2013.01); *C08F 10/02* (2013.01); *B01J 21/063* (2013.01); *B01J 31/0212* (2013.01); *B01J 31/04* (2013.01); *B01J 31/34* (2013.01); *B01J 31/38* (2013.01)

(58) Field of Classification Search
CPC .................................................. C08F 110/02
See application file for complete search history.

(56) References Cited

U.S. PATENT DOCUMENTS

| | | |
|---|---|---|
| 2,503,913 A | 4/1950 | Kimberlin, Jr. |
| 3,119,569 A | 1/1964 | Baricordi |
| 3,248,179 A | 4/1966 | Norwood |
| 3,480,011 A | 11/1969 | Cousteau |
| 3,622,521 A | 11/1971 | Hogan |
| 3,875,079 A | 4/1975 | Witt |
| 3,882,096 A | 5/1975 | Shida |
| 3,887,494 A | 6/1975 | Dietz |
| 3,900,457 A | 8/1975 | Witt |
| 3,970,613 A | 7/1976 | Goldie |
| 3,976,632 A | 8/1976 | Delap |
| 4,041,224 A | 8/1977 | Hoff |
| 4,053,436 A | 10/1977 | Hogan |
| 4,119,569 A | 10/1978 | Dietz |
| 4,169,926 A | 10/1979 | McDaniel |
| 4,190,457 A | 2/1980 | McDaniel |
| 4,218,345 A | 8/1980 | Hoff |
| 4,247,421 A | 1/1981 | McDaniel |
| 4,280,141 A | 7/1981 | McCann |
| 4,294,724 A | 10/1981 | McDaniel |
| 4,296,001 A | 10/1981 | Hawley |
| 4,299,731 A | 11/1981 | McDaniel |
| 4,312,967 A | 1/1982 | Norwood |
| 4,345,055 A | 8/1982 | Hawley |
| 4,368,303 A | 1/1983 | McDaniel |
| 4,402,864 A | 9/1983 | McDaniel |
| 4,405,501 A | 9/1983 | Witt |
| 4,424,320 A | 1/1984 | McDaniel |
| 4,434,243 A | 2/1984 | Martin |
| 4,442,275 A | 4/1984 | Martin |

(Continued)

FOREIGN PATENT DOCUMENTS

| | | |
|---|---|---|
| EP | 0033953 A2 | 8/1981 |
| EP | 0088989 A2 | 9/1983 |

(Continued)

OTHER PUBLICATIONS

Bird, R. Byron, et al., "Dynamics of Polymeric Liquids," Fluid Mechanics, vol. 1, Second Edition, 1987, cover page, publishing page, pp. xiii-xviii, and 171-172, John Wiley & Sons, Inc.

(Continued)

*Primary Examiner* — Catherine S Branch

(74) *Attorney, Agent, or Firm* — Conley Rose, P.C.

(57) ABSTRACT

A method of preparing a catalyst comprising a) contacting a titanium-containing compound, a solvating agent, and a solvent to form a solution; b) contacting the solution with a chrominated silica-support to form a pre-catalyst; and c) thermally treating the pre-catalyst by heating to a temperature of from about 400° C. to about 1000° C. for a time period of from about 1 minute to about 24 hours to form the catalyst.

20 Claims, No Drawings

(56) References Cited

U.S. PATENT DOCUMENTS

| | | |
|---|---|---|
| 4,446,243 A | 5/1984 | Chester |
| 4,501,885 A | 2/1985 | Sherk |
| 4,547,557 A | 10/1985 | McDaniel |
| 4,559,394 A | 12/1985 | McDaniel |
| 4,588,790 A | 5/1986 | Jenkins, III |
| 4,832,002 A | 5/1989 | Medina |
| 4,981,831 A | 1/1991 | Knudsen |
| 5,115,053 A | 5/1992 | Knudsen |
| 5,183,792 A | 2/1993 | Wang |
| 5,231,066 A | 7/1993 | Rekers |
| 5,284,926 A | 2/1994 | Benham |
| 5,352,749 A | 10/1994 | Dechellis |
| 5,426,082 A | 6/1995 | Marsden |
| 5,436,304 A | 7/1995 | Griffin |
| 5,455,314 A | 10/1995 | Burns |
| 5,478,898 A | 12/1995 | Standaert |
| 5,565,175 A | 10/1996 | Hottovy |
| 5,575,979 A | 11/1996 | Hanson |
| 5,576,262 A | 11/1996 | Denton |
| 5,599,762 A | 2/1997 | Denton |
| 5,914,291 A | 6/1999 | Marsden |
| 5,965,675 A | 10/1999 | Kellum |
| 6,200,920 B1 | 3/2001 | Debras |
| 6,239,235 B1 | 5/2001 | Hottovy |
| 6,262,191 B1 | 7/2001 | Hottovy |
| 6,423,663 B2 | 7/2002 | Debras |
| 6,482,901 B1 | 11/2002 | Debras |
| 6,489,248 B2 | 12/2002 | Zhang |
| 6,624,324 B2 | 9/2003 | Iwakura |
| 6,657,023 B2 | 12/2003 | Bergmeister |
| 6,707,498 B1 | 3/2004 | Toma |
| 6,833,415 B2 | 12/2004 | Kendrick |
| 6,855,781 B2 | 2/2005 | Bergmeister |
| 7,088,394 B2 | 8/2006 | Rossi |
| 7,262,259 B2 | 8/2007 | Katzen |
| 7,375,169 B1 | 5/2008 | Smith |
| 7,390,395 B2 | 6/2008 | Elomari |
| 7,700,516 B2 | 4/2010 | McDaniel |
| 7,803,736 B2 | 9/2010 | Rohde |
| 7,981,832 B2 | 7/2011 | McDaniel |
| 8,183,173 B2 | 5/2012 | McDaniel |
| 8,367,785 B2 | 2/2013 | Chamayou |
| 8,372,771 B2 | 2/2013 | Benham |
| 9,023,967 B2 | 5/2015 | Yu |
| 9,096,699 B2 | 8/2015 | McDaniel |
| 9,243,091 B2 | 1/2016 | Moineau |
| 9,587,048 B2 | 3/2017 | Praetorius |
| 9,598,513 B2 | 3/2017 | Yu |
| 9,796,798 B2 | 10/2017 | Praetorius |
| 9,988,460 B2 | 6/2018 | Spreter Von Kreudenstein |
| 10,213,766 B2 | 2/2019 | Praetorius |
| 10,287,369 B2 | 5/2019 | Schwerdtfeger |
| 10,323,108 B2 | 6/2019 | Yu |
| 10,323,109 B2 | 6/2019 | McDaniel |
| 10,513,570 B2 | 12/2019 | McDaniel |
| 10,543,480 B2 | 1/2020 | McDaniel |
| 10,654,953 B2 | 5/2020 | McDaniel |
| 10,669,362 B2 | 6/2020 | McDaniel |
| 2003/0007083 A1 | 1/2003 | Rossi |
| 2004/0026324 A1 | 2/2004 | Luca |
| 2005/0153830 A1 | 7/2005 | Jensen |
| 2005/0192177 A1 | 9/2005 | Roger |
| 2005/0272886 A1 | 12/2005 | Cann |
| 2007/0034549 A1 | 2/2007 | Elomari |
| 2008/0038161 A1 | 2/2008 | Marti |
| 2011/0201768 A1 | 8/2011 | Benham |
| 2013/0137839 A1 | 5/2013 | Yu |
| 2013/0144017 A1 | 6/2013 | McDaniel |
| 2014/0275457 A1 | 9/2014 | McDaniel |
| 2014/0295178 A1 | 10/2014 | Watanabe |
| 2015/0065667 A1 | 3/2015 | Cheng |
| 2015/0203614 A1 | 7/2015 | Yu |
| 2017/0037158 A1 | 2/2017 | Yu |
| 2017/0080406 A1 | 3/2017 | Praetorius |
| 2017/0145124 A1 | 5/2017 | Yu |
| 2019/0314787 A1 | 10/2019 | McDaniel |

FOREIGN PATENT DOCUMENTS

| | | |
|---|---|---|
| EP | 0314385 A2 | 5/1989 |
| EP | 0085857 B1 | 8/1989 |
| EP | 0337365 A2 | 10/1989 |
| EP | 0439294 A1 | 7/1991 |
| EP | 0033971 B1 | 2/1994 |
| EP | 0589643 A1 | 3/1994 |
| EP | 0455444 B1 | 10/1997 |
| EP | 0882744 B1 | 7/2003 |
| EP | 0882743 B1 | 11/2003 |
| EP | 1845110 A1 | 10/2007 |
| EP | 2606962 A1 | 6/2013 |
| GB | 1197069 A | 7/1970 |
| GB | 1369485 A | 10/1974 |
| GB | 1405721 A | 9/1975 |
| GB | 1415649 A | 11/1975 |
| GB | 1447605 A | 8/1976 |
| GB | 1575419 A | 9/1980 |
| JP | 2011117006 A | 6/2011 |
| KR | 20070015410 A | 2/2007 |
| WO | 1993011173 A1 | 6/1993 |
| WO | 2002002652 A2 | 1/2002 |
| WO | 2003033550 A1 | 4/2003 |
| WO | 2004052948 A1 | 6/2004 |
| WO | 2005103100 A1 | 11/2005 |
| WO | 2009042149 A2 | 4/2009 |
| WO | 2009045215 A1 | 4/2009 |
| WO | 2010034464 A1 | 4/2010 |
| WO | 2012040144 A1 | 3/2012 |
| WO | 2013081826 A1 | 6/2013 |
| WO | 2013082346 A2 | 6/2013 |
| WO | 2017032535 A1 | 3/2017 |

OTHER PUBLICATIONS

Bouh, Abdillahi Omar, et al., "Mono- and dinuclear silica-supported titanium(IV) complexes and the effect of TiOTi connectivity on reactivity," J. Am. Chem. Soc., 1999, pp. 7201-7210, vol. 121, American Chemical Society.

Conway, Steven J., et al., "Chromia/silica-titania cogel catalysts for ethene polymerisation," J. Chem. Soc., Faraday Trans., 1989, pp. 1841-1851, vol. 85, No. 7.

Conway, Steven J., et al., "Chromia/silica-titania cogel catalysts for ethene polymerisation," J. Chem. Soc., Faraday Trans., 1989, pp. 79-90, vol. 85, No. 1.

Ellison, Alan, et al., "Characterisation of cr/silica catalysts," J. Chem. Soc. Faraday Trans., 1993, pp. 4393-4395, vol. 89, No. 24.

Ellison, Alan, et al., "Characterisation of modified cr-silica catalysts," Journal of Molecular Catalysis, 1994, pp. 81-86, vol. 90, Elsevier Science B.V.

Hieber. C. A., et al., "Shear-rate-dependence modeling of polymer melt viscosity," Polymer Engineering and Science, Jul. 7, 1992, pp. 931-938, vol. 32, No. 14.

Hieber, C. A., et al., "Some correlations involving the shear viscosity of polystyrene melts," Rheol Acta, 1989, pp. 321-332, vol. 28.

Iler, Ralph K., "The Chemistry of Silica: Solubility, Polymerization, Colloid and Surface Properties and Biochemistry of Silica," 1979, 1 page, Wiley.

International Search Report and Written Opinion issued in corresponding application No. PCT/US2018/059953, dated May 10, 2019, 19 pages.

Mabilon, G., et al., "Copolymerisation ethylene-propylene par des catalyseurs a l'oxyde de chrome," Eur. Polym. J., 1985, pp. 245-249, vol. 21, No. 3, Pergamon Press Ltd., Great Britain.

Max McDaniel, "Some Reflections On the Current State of Cr-Based Polymerization Catalysts", M R S Bulletin, vol. 38, No. 03, Mar. 1, 2013, pp. 234-238; XP055558412; ISSN: 0883-7694; DOI: 10.1557/mrs.2013.48.

McDaniel, M. P., et al., Activation of Phillips Cr/silica catalysts IV.

(56) References Cited

OTHER PUBLICATIONS

Mobility of Cr(VI), Journal of Catalysis, 1982, pp. 37-47, vol. 76, Academic Press, Inc.

McDaniel, M. P., et al., "The activation of the phillips polymerization catalyst," Journal of Catalysis, 1983, pp. 118-126, vol. 82, Academic Press, Inc.

McDaniel, M. P., et al., The State of Cr(VI) on the Phillips Polymerization Catalyst, Journal of Catalysis, 1982, pp. 29-36, vol. 76, Academic Press, Inc.

McDaniel, M. P., et al., Activation of Phillips Cr/silica catalysts IV. Mobility of Cr(VI), Journal of Catalysis, 2007, pp. 281-295, vol. 252, Academic Press, Inc.

Niemanstverdriet, J.W., "Spectroscopy in Catalysis: An Introduction," Jul. 11, 2008, 3rd Edition, pp. 251-295, Section 9.5, Wiley-VCH.

Paul J. DesLauries, et al., "Short Chain Branching Profiles in Polyethylene From the Phillips Cr/Silica Catalyst", Journal of Polymer Science Part A: Polymer Chemistry, vol. 45, No. 15, Aug. 1, 2007, pp. 3135-3149; XP055124768; ISSN: 0887-624X; DOI: 10.1002/pola.22174.

Product Information, "LUDOX® SM-AS Colloidal Silica," 2005, W. R. Grace & Co.-Conn., 2 pages.

Pullukat, T. J., et al., "A chemical study of thermally activated chromic titanate on silica ethylene polymerization catalysts," Journal of Polymer Science: Polymer Chemistry Edition, 1980, pp. 2857-2866, vol. 18, John Wiley & Sons, Inc.

Pullukat, Thomas J., et al., "Titanium modified chromium catalysts for ethylene polymerization," Symposium on Transition Metal Catalysts Polymerization, Michigan Molecular Institute, Aug. 1981, pp. 697-712.

Rebenstorf, B., et al., "Influence of chromium concentration and addition of fluorine, titanium, or boron on the chromium species of the phillips catalyst: a quantitative evaluation," Langmuir, 1991, pp. 2160-2165, vol. 7, American Chemical Society.

Yu, Youlu, et al., "SEC-MALS method for the determination of long-chain branching and long-chain branching distribution in polyethylene," Polymer, 2005, pp. 5165-5182, vol. 46, Elsevier Ltd.

Yu, Youlu, et al., "Size-exclusion chromatography coupled to multiangle light scattering detection of long-chain branching in polyethylene made with phillips catalyst," Journal of Polymer Science Part A: Polymer Chemistry, 2012, vol. 50, pp. 1166-1173, Wiley Periodicals, Inc.

U.S. Appl. No. 16/237,011, filed Dec. 31, 2018, 2019/0134610, May 9, 2019.

U.S. Appl. No. 16/571,281, filed Sep. 16, 2019, 2020/0010587, Jan. 9, 2020.

U.S. Appl. No. 15/953,927, filed Apr. 16, 2018, 2019/0204075, Oct. 17, 2019.

U.S. Appl. No. 16/711,304, filed Dec. 11, 2019, 2020/0164351, May 28, 2020.

U.S. Appl. No. 16/774,891, filed Jan. 28, 2020, U.S. Pat. No. 10,722,874, Jul. 28, 2020.

U.S. Appl. No. 16/907,801, filed Jun. 22, 2020.

U.S. Appl. No. 16/987,128, filed Aug. 6, 2020.

U.S. Appl. No. 16/439,067, filed Jun. 12, 2019.

U.S. Appl. No. 16/861,705, filed Apr. 29, 2020.

U.S. Appl. No. 16/439,074, filed Jun. 12, 2019.

U.S. Appl. No. 16/861,486, filed Apr. 29, 2020.

U.S. Appl. No. 16/439,078, filed Jun. 12, 2019.

U.S. Appl. No. 17/090,590, filed Nov. 5, 2020.

METHODS OF PREPARING A CATALYST UTILIZING HYDRATED REAGENTS

CROSS-REFERENCE TO RELATED APPLICATIONS

This application is a continuation of and claims priority to U.S. patent application Ser. No. 16/863,243 filed Apr. 30, 2020, and published as U.S. Patent Application Publication No 2020/0255559 A1, which is a continuation of and claims priority to U.S. patent application Ser. No. 16/387,199 filed Apr. 17, 2019, now U.S. Pat. No. 10,669,362 B2, which is a continuation of and claims priority to U.S. patent application Ser. No. 15/816,131 filed Nov. 17, 2017, now U.S. Pat. No. 10,323,109 B2, all entitled "Methods of Preparing a Catalyst Utilizing Hydrated Reagents," each of which is incorporated by reference herein in its entirety.

TECHNICAL FIELD

The present disclosure relates to catalyst compositions. More specifically, the present disclosure relates to methods of preparing olefin polymerization catalyst compositions and polymers prepared from same.

BACKGROUND

An economically important class of olefin polymerization catalysts includes chromium-silica-titanium catalysts. Rigorous drying of the water-sensitive catalyst components is often required but drying processes increase the time and cost of production. Development of an aqueous solution suitable for depositing titanium onto a silica-based catalyst support would reduce the costs of production of olefin polymerization catalysts. Thus, there is an ongoing need to develop new methods of producing olefin polymerization catalysts.

SUMMARY

Disclosed herein is a method of preparing a catalyst comprising a) contacting a titanium-containing compound, a solvating agent, and a solvent to form a solution; b) contacting the solution with a chrominated silica-support to form a pre-catalyst; and c) thermally treating the pre-catalyst by heating to a temperature of from about 400° C. to about 1000° C. for a time period of from about 1 minute to about 24 hours to form the catalyst.

Also disclosed herein is a method of preparing a catalyst comprising a) contacting a titanium-containing compound, a solvating agent, and a solvent to form a solution; b) contacting the solution with a silica-support to form a titanated support; c) contacting the titanated support with a chromium-containing compound to form a pre-catalyst; and d) thermally treating the pre-catalyst by heating to a temperature of from about 400° C. to about 1000° C. for a time period of from about 1 minute to about 24 hours to form the catalyst.

Also disclosed herein is a method of preparing a catalyst comprising a) contacting a titanium-containing compound, a solvating agent, and a solvent to form a solution; b) contacting a silica support, a chromium-containing compound and the solution to form a pre-catalyst; and c) thermally treating the pre-catalyst by heating to a temperature of from about 400° C. to about 1000° C. for a time period of from about 1 minute to about 24 hours to form the catalyst.

Also disclosed herein is a method of preparing a catalyst comprising a) contacting a titanium-containing compound, a solvating agent, and a solvent to form a solution; b) contacting a silica-support and a chromium-containing compound to form a chrominated support; c) contacting the solution of step (a) with the chrominated support of step (b) to form a pre-catalyst; and d) thermally treating the pre-catalyst by heating to a temperature of from about 400° C. to about 1000° C. for a time period of from about 1 minute to about 24 hours to form the catalyst.

Also disclosed herein is a method of preparing a catalyst comprising a) contacting a silica support, a chromium-containing compound, a titanium-containing compound, a solvating agent, and a solvent to form a pre-catalyst; and b) thermally treating the pre-catalyst by heating to a temperature of from about 400° C. to about 1000° C. for a time period of from about 1 minute to about 24 hours to form the catalyst.

Also disclosed herein is a method of preparing a catalyst comprising a) contacting Ti(OiPr)$_4$, water, and ascorbic acid to form a solution; b) contacting the solution with a chrominated silica-support to form a pre-catalyst; and c) thermally treating the pre-catalyst by heating to a temperature of from about 400° C. to about 1000° C. for a time period of from about 1 minute to about 24 hours to form the catalyst.

DETAILED DESCRIPTION

In an aspect, a method of preparing an olefin polymerization catalyst of the present disclosure comprises contacting an aqueous solution comprising a solvating agent and titanium with a chrominated silica-support under conditions suitable for formation of the olefin polymerization catalyst. In a further aspect, a method of preparing an olefin polymerization catalyst of the present disclosure comprises contacting a solution comprising a solvating agent, titanium and chromium with a silica-support under conditions suitable for formation of the olefin polymerization catalyst.

While these aspects may be disclosed under a particular heading, the heading does not limit the disclosure found therein. Additionally, the various aspects and embodiments disclosed herein can be combined in any manner.

A method for preparation of an olefin polymerization catalyst as described herein comprises use of a solvating agent to form a titanium solution. In an aspect, the solvating agent used to form titanium solution comprises a β-hydroxy-α,β-unsaturated carbonyl-containing compound, an α,β-dihydroxy-α,β-unsaturated carbonyl-containing compound, or a combination thereof. In a further aspect, the solvating agent comprises a compound having Structure CS 1, Structure CS 2, Structure CS 3, Structure CS 4, Structure CS 5, or Structure CS 6

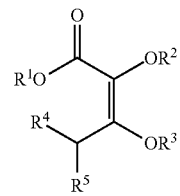

CS 1

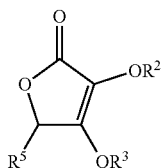
CS 2

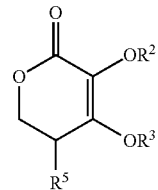
CS 3

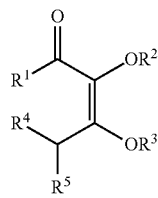
CS 4

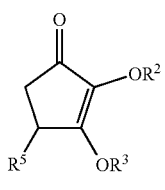
CS 5

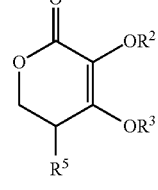
CS 6 where $R^1$ is a $C_1$ to $C_{12}$ organyl group or a $C_6$ to $C_{12}$ aryl group; $R^2$ and $R^3$ are each independently hydrogen, —$CH_2OCH_3$, —$CH_2SCH_3$, or $SiY_3$; $R^4$ is —OH, —$OCH_2OCH_3$, —$OCH_2SCH_3$, —$OSiY_3$, hydrogen, a $C_2$ to $C_{12}$ organyl group, or a $C_6$ to $C_{12}$ aryl group; $R^5$ is —CH($OR^6$)$CH_2OR^7$, —OH, —$OCH_2OCH_3$, —$OCH_2SCH_3$, —$OSiY_3$, hydrogen, a $C_2$ to $C_{12}$ organyl group, or a $C_6$ to $C_{12}$ aryl group; and $R^6$ and $R^7$ are each independently hydrogen, —$CH_2OCH_3$, —$CH_2SCH_3$, or $SiY_3$; and Y can be methyl (Me), isopropyl (iPr), tert-butyl (t-Bu) or a combination thereof. The term "organyl group" is used herein in accordance with the definition specified by IUPAC: an organic substituent group, regardless of functional type, having one free valence at a carbon atom. The term "aryl group" is used herein in accordance with the definition specified by IUPAC: an organic substituent group regardless of functional type derived from arenes by removal of a hydrogen atom from a ring carbon atom.

Nonlimiting examples of solvating agents suitable for use in the present disclosure include ascorbic acid, L-ascorbic acid, D-ascorbic acid, L-isoascorbic acid, D-isoascorbic acid, D-erythorbic acid, oxytetronic acid, reductic acid, combinations thereof and derivatives thereof. In a particular aspect, the solvating agent comprises ascorbic acid.

In an aspect, solvent for use in preparation of an olefin polymerization catalyst comprises an aqueous solution, a nonaqueous solution, an alcohol, or combinations thereof. In an aspect, the solvent comprises an ester, a ketone, an alcohol, or combinations thereof. In an aspect, the solvent comprises a $C_1$ to $C_{20}$ ester, a $C_1$ to $C_{10}$ ester or a $C_1$ to $C_5$ ester. In another aspect, the solvent comprises a $C_1$ to $C_{20}$ ketone, a $C_1$ to $C_{10}$ ketone or a $C_1$ to $C_5$ ketone. In another aspect, the solvent comprises a $C_1$ to $C_{20}$ alcohol, a $C_1$ to $C_{10}$ alcohol or a $C_1$ to $C_5$ alcohol.

Non-limiting examples of esters suitable for use as solvents of the present disclosure include ethyl acetate, propyl acetate, butyl acetate, isobutyl isobutyrate, methyl lactate, ethyl lactate and combinations thereof. Non-limiting examples of ketones suitable for use as solvents in the present disclosure include acetone, ethyl methyl ketone, methyl isobutyl ketone and combinations thereof. Non-limiting examples of alcohols suitable for use as solvents of the present disclosure include methanol, ethanol, n-propanol, isopropanol, n-butanol, isobutanol, pentanol, hexanol, heptanol, octanol, benzyl alcohol, phenol, cyclohexanol and combinations thereof.

In an aspect, the solvent comprises an aliphatic hydrocarbon, an aromatic hydrocarbon, a halogenated aliphatic hydrocarbon, a halogenated aromatic hydrocarbon, or combinations thereof.

In an aspect, the solvent comprises a $C_3$ to $C_{20}$ aliphatic hydrocarbon; alternatively, a $C_4$ to $C_{15}$ aliphatic hydrocarbon; or alternatively, a $C_5$ to $C_{10}$ aliphatic hydrocarbon. Aliphatic hydrocarbons which can be utilized as the solvent can be cyclic, acyclic, linear or branched, unless otherwise specified. Non-limiting examples of suitable acyclic aliphatic hydrocarbon solvents that can be utilized singly or in any combination include propane, iso-butane, n-butane, butane (n-butane or a mixture of linear and branched $C_4$ acyclic aliphatic hydrocarbons), pentane (n-pentane or a mixture of linear and branched $C_5$ acyclic aliphatic hydrocarbons), hexane (n-hexane or mixture of linear and branched $C_6$ acyclic aliphatic hydrocarbons), heptane (n-heptane or mixture of linear and branched $C_7$ acyclic aliphatic hydrocarbons), octane (n-octane or a mixture of linear and branched $C_8$ acyclic aliphatic hydrocarbons) and combinations thereof.

In an aspect, the solvent comprises an aromatic hydrocarbon. Aromatic hydrocarbons which can be useful as a solvent a $C_6$ to $C_{20}$ aromatic hydrocarbon or alternatively, a $C_6$ to $C_{10}$ aromatic hydrocarbon. Other non-limiting examples of suitable aromatic hydrocarbons that can be utilized singly or in any combination in the present disclosure include benzene, toluene, xylene (including ortho-xylene, meta-xylene, para-xylene, or mixtures thereof), ethylbenzene, and combinations thereof.

In an aspect, the solvent comprises a halogenated aliphatic hydrocarbon. Halogenated aliphatic hydrocarbons which can be useful as a solvent include $C_1$ to $C_{15}$ halogenated aliphatic hydrocarbons; alternatively, $C_1$ to $C_{10}$ halogenated aliphatic hydrocarbons; or alternatively, $C_1$ to $C_5$ halogenated aliphatic hydrocarbons. The halogenated aliphatic hydrocarbons can be cyclic, acyclic, linear or branched unless otherwise specified. Non-limiting examples of suitable halogenated aliphatic hydrocarbons which can be utilized include methylene chloride, chloroform, carbon tetrachloride, dichloroethane, trichloroethane, and combinations thereof; alternatively, methylene chloride, chloroform, dichloroethane, trichloroethane and combinations thereof.

In an aspect, the solvent comprises a halogenated aromatic hydrocarbon. Halogenated aromatic hydrocarbons which can be useful as solvent include without limitation $C_6$ to $C_{20}$ halogenated aromatic hydrocarbons; or alternatively, $C_6$ to $C_{10}$ halogenated aromatic hydrocarbons. Non-limiting examples of suitable halogenated aromatic hydrocarbons include chlorobenzene, dichlorobenzene, and combinations thereof.

In an aspect, a solvent suitable for use in the present disclosure comprises methanol, ethanol, isopropanol, n-propanol, butanol, acetone, methylethylketone, ethyl acetate, heptane or combinations thereof.

In an aspect of the present disclosure, the olefin polymerization catalyst comprises titanium. The source of the titanium may be any titanium-containing compound capable of providing effective titanation to the olefin polymerization catalyst. In a further aspect, the titanium-containing compound comprises a tetravalent titanium ($Ti^{4+}$)-containing compound or a trivalent titanium ($Ti^{3+}$)-containing compound. The $Ti^{4+}$-containing compound may be any compound that comprises tetravalent titanium, alternatively the $Ti^{4+}$-containing compound may be any compound that is able to release a $Ti^{4+}$ species upon dissolving into solution. The $Ti^{3+}$-containing compound may be any compound that comprises trivalent titanium, alternatively the $Ti^{3+}$-containing compound may be any compound that is able to release a $Ti^{3+}$ species upon dissolving into solution. In an aspect, the titanium-containing compound is an organotitanium containing at least one alkoxide group, or alternatively, at least two alkoxide groups. Alternatively, the titanium-containing compound comprises a titanium tetraalkoxide. In an aspect, the titanium tetraalkoxide is titanium ethoxide $Ti(OEt)_4$, titanium isopropoxide $Ti(OiPr)_4$, titanium n-propoxide $Ti(nOPr)_4$, titanium butoxide $Ti(OBu)_4$, titanium 2-ethyl-hexoxide, or combinations thereof.

In a still further aspect, the titanium-containing compound may be characterized by the general formula $Ti(OR^1)_2$(acac)$_2$ wherein $R^1$ can be ethoxide, isopropoxide, n-propoxide, butoxide, or a combination thereof and "acac" is acetylacetonate. Alternatively, the titanium-containing compound may be characterized by the general formula $Ti(OR^1)_2$(oxal) wherein $R^1$ can be ethoxide, isopropoxide, n-propoxide, butoxide, or a combination thereof and "oxal" is oxalate.

In yet another aspect, titanium-containing compound is a titanium halide such as characterized by the general formula $TiX_4$ where X is chloride or bromide.

The amount of titanium present in the olefin polymerization catalyst may range from about 0.01 wt. % to about 10 wt. %; alternatively, from about 0.5 wt. % to about 5 wt. %; alternatively, from about 1 wt. % to about 4 wt. %; or alternatively, from about 2 wt. % to about 4 wt. %. titanium by weight of the olefin polymerization catalyst. In another aspect of the present disclosure, the amount of titanium in the olefin polymerization catalyst may range from about 1 wt. % to about 5 wt. % titanium by weight of the olefin polymerization catalyst. Herein, the percentage of titanium refers to the final weight percent of titanium associated with the olefin polymerization catalyst by total weight of the olefin polymerization catalyst after all processing steps (e.g., after activation via calcination).

In an aspect, the olefin polymerization catalyst of the present disclosure comprises a silica-support. In an aspect, preparation of an olefin polymerization catalyst of the type disclosed herein excludes thermal treatment of the silica-support prior to contact with any other catalyst component. Consequently, a silica-support suitable for use in the present disclosure may be termed a hydrated silica-support. Without wishing to be limited by theory, a hydrated silica-support comprises a silica-support wherein water evolution occurs when the silica-support is heated within a range of from about 180° C. to about 200° C. under vacuum conditions for a period of time ranging from about 8 hours to about 20 hours. In a further aspect, the silica-support may contain from about 0.1 wt. % to about 20 wt. % water; or alternatively from about 0.1 wt. % to about 10 wt. % water based upon the total weight of the silica-support.

A silica-support suitable for use in the present disclosure may have a surface area and pore volume effective to provide for the production of an active olefin polymerization catalyst. In an aspect of the present disclosure, the silica-support possesses a surface area in the range of from about 100 $m^2$/gram to about 1000 $m^2$/gram, alternatively from about 250 $m^2$/gram to about 1000 $m^2$/gram, alternatively from about 250 $m^2$/gram to about 700 $m^2$/gram, alternatively from about 250 $m^2$/gram to about 600 $m^2$/gram, or alternatively greater than about 250 $m^2$/gram. The silica-support may be further characterized by a pore volume of greater than about 0.9 $cm^3$/gram, alternatively greater than about 1.0 $cm^3$/gram, or alternatively greater than about 1.5 $cm^3$/gram. In an aspect of the present disclosure, the silica-support is characterized by a pore volume ranging from about 1.0 $cm^3$/gram to about 2.5 $cm^3$/gram. The silica-support may be further characterized by an average particle size of from about 10 microns to about 500 microns, alternatively about 25 microns to about 300 microns, or alternatively about 40 microns to about 150 microns. Generally, the average pore size of the silica-support ranges from about 10 Angstroms to about 1000 Angstroms. In one aspect of the present disclosure, the average pore size of the silica-support is in the range of from about 50 Angstroms to about 500 Angstroms, while in yet another aspect of the present disclosure the average pore size ranges from about 75 Angstroms to about 350 Angstroms.

The silica-support may contain greater than about 50 wt. % silica; alternatively, greater than about 80 wt. % silica; or alternatively, greater than about 95 wt. % silica based upon the weight of the silica-support. The silica-support may be prepared using any suitable method, for example the silica-support may be prepared synthetically by hydrolyzing tetrachlorosilane ($SiCl_4$) with water or by contacting sodium silicate with a mineral acid. The silica-support may include additional components that do not adversely affect the catalyst, such as zirconia, alumina, thoria, magnesia, fluoride, sulfate, phosphate, or mixtures thereof. Non-limiting examples of silica-supports suitable for use in this disclosure include ES70 which is a silica-support material with a surface area of 300 $m^2$/gram, and a pore volume of 1.6 $cm^3$/gram that is commercially available from PQ Corporation; and V398400 which is a silica-support material that is commercially available from Evonik.

The silica-support may be present in the olefin polymerization catalyst in an amount of from about 50 wt. % to about 99 wt. %; or alternatively, from about 80 wt. % to about 99 wt. %. Herein the percentage of silica-support refers to the final weight percent of silica-support associated with the olefin polymerization catalyst by total weight of the olefin polymerization catalyst after all processing steps (e.g., after activation via calcination).

In an aspect of the present disclosure, the olefin polymerization catalyst comprises chromium. In a particular aspect, the source of the chromium may be any chromium-containing compound capable of providing a sufficient amount of chromium to the olefin polymerization catalyst. For example, the chromium-containing compound may be a water-soluble compound or a hydrocarbon-soluble compound. Examples of water-soluble chromium compounds include chromium trioxide, chromium acetate, chromium nitrate, or combinations thereof. Examples of hydrocarbon-soluble chromium compounds include tertiary butyl chromate, a diarene chromium (0) compound, biscyclopentadienyl chromium (II), chromium (III) acetylacetonate, or combinations thereof. In one aspect of the present disclosure, the chromium-containing compound may be a chromium (II) compound, a chromium (III) compound, or combinations thereof. Suitable chromium (III) compounds include, but are not limited to, chromium carboxylates, chromium naphthenates, chromium halides, chromium sulfate, chromium nitrate, chromium dionates, or combinations thereof. Specific chromium (III) compounds include, but are not limited to, chromium (III) sulfate, chromium (III) chloride, chromium (III) nitrate, chromic bromide, chromium (III) acetylacetonate, and chromium (III) acetate. Suitable chromium (II) compounds include, but are not limited to, chromous chloride, chromous bromide, chromous iodide, chromium (II) sulfate, chromium (II) acetate, or combinations thereof.

The amount of chromium present in the olefin polymerization catalyst may range from about 0.01 wt. % to about 10 wt. %; alternatively, from about 0.5 wt. % to about 5 wt. %; alternatively, from about 1 wt. % to about 4 wt. %; or alternatively, from about 2 wt. % to about 4 wt. % chromium by weight of the olefin polymerization catalyst. In another aspect of the present disclosure, the amount of chromium present in the olefin polymerization catalyst may range from about 1 wt. % to about 5 wt. %. Herein, the percentage chromium refers to the final weight percent chromium associated with the olefin polymerization catalyst by total weight of the olefin polymerization catalyst after all processing steps (e.g., after activation via calcination).

In some aspects of this disclosure, chromium is provided to the olefin polymerization catalyst as a component of the silica support. In such aspects, the olefin polymerization catalyst may be prepared using a chromated silica-support having the characteristics disclosed herein for a silica support while additionally containing chromium in the amounts also disclosed herein. An example of such material suitable for use in the present disclosure is HW30A which is a chromated silica-support material that is commercially available from W. R. Grace and Company.

Disclosed herein are methods of preparing an olefin polymerization catalyst composition comprising contacting the catalyst components disclosed herein. Various sequences for contacting of the catalyst components are also disclosed herein, e.g., forming an aqueous solution comprising titanation followed by contacting the solution with a silica-support. It is contemplated that other sequences for the contacting of the catalyst components may also produce an olefin polymerization catalyst of the type disclosed herein. Consequently, in an aspect of the present disclosure the catalyst components may be contacted in any order or fashion deemed suitable to one of ordinary skill in the art with the aid of the present disclosure to produce a catalyst of the type disclosed herein.

In the following aspects, a weight ratio of solvating agent to silica may range from about 0.5:1 to about 10:1, alternatively from about 1:1 to about 5:1 or alternatively from about 2:1 to about 5:1. Further, the present disclosure contemplates the formation of a solvating agent-titanium complex/association that results in effective titanation of the support material. In some aspects formation of this solvating agent-titanium complex/association is indicated by the mixture developing a deep red color when both the solvating agent and titanium are present in a mixture.

In an aspect of the present disclosure, a method for preparation of an olefin polymerization catalyst comprises contacting an aqueous solvent, a solvating agent and a titanium-containing compound, all of the type disclosed herein, to form an aqueous solution comprising titanium. The method may further comprise contacting the aqueous solution comprising titanium with a chromated silica-support to form a mixture comprising a pre-catalyst (e.g., a chromated, titanated support). In an aspect, preparation of an olefin polymerization catalyst excludes thermal treatment of the chromated silica-support prior to contact with any other catalyst component.

In an aspect of the present disclosure, a method for preparation of an olefin polymerization catalyst of the type disclosed herein comprises contacting an aqueous solvent, a solvating agent and a titanium-containing compound, all of the type disclosed herein, to form an aqueous solution comprising titanium. The method may further comprise contacting the aqueous solution comprising titanium with a silica-support to form a first mixture comprising a titanated support. In an aspect, the method further comprises contacting the first mixture comprising the titanated support with a chromium-containing compound to form a second mixture comprising a pre-catalyst (e.g., a chromated, titanated support).

In an aspect of the present disclosure, a method for preparation of an olefin polymerization catalyst comprises contacting an aqueous solvent, a solvating agent and a titanium-containing compound, all of the type disclosed herein, to form an aqueous solution comprising titanium. The method may further comprise contacting the aqueous solution comprising titanium with a silica-support and a chromium-containing compound to form a mixture comprising a pre-catalyst (e.g., a chromated, titanated support).

In an aspect of the present disclosure, a method for preparation of an olefin polymerization catalyst of the type disclosed herein comprises contacting a silica-support with a chromium-containing compound to form a chromated support. The method may further comprise contacting an aqueous solvent, a solvating agent and a titanium-containing compound, all of the type disclosed herein, to form an aqueous solution comprising titanium. The chromated support may then be contacted with the aqueous solution comprising titanium to form a mixture comprising a pre-catalyst (e.g., a chromated, titanated support).

In an aspect of the present disclosure, a method for preparation of an olefin polymerization catalyst of the type disclosed herein comprises simultaneously contacting an aqueous solvent, a solvating agent, a titanium-containing compound, a silica-support, and a chromium-containing compound, all of the type disclosed herein, to form an aqueous mixture comprising a pre-catalyst (e.g., a chromated, titanated support).

The present disclosure contemplates the use of a hydrated support material in the preparation of the olefin polymerization catalyst. Thus, preparation of an olefin polymerization catalyst of the present disclosure excludes thermal treatment of the support material (e.g., silica-support, chromated silica support) prior to contact with any other catalyst component. Consequently, the support material may contain from about 0.1 wt. % to about 20 wt. % water.

In some aspects of the present disclosure, any contacting of the olefin polymerization catalyst components may be carried out in the presence of a reaction media. Specifically, the liquid associated with each component utilized in preparation of the olefin polymerization catalyst (e.g., water associated with the silica support, the titanium-containing compound, the chromium-containing compound, etc.) and optionally an added solvent (e.g., water) may form the reaction media in each contacting step described herein. In an aspect, the reaction media excludes any solid component utilized in the preparation methodology disclosed herein (e.g., excludes the silica-support and any solids associated therewith). In some aspects, the sum of an amount of water present in any reaction media formed during preparation of the olefin polymerization catalyst is from about 1 wt. % to about 99 wt. % based on the total weight of the reaction media (e.g., all liquid components including water and any non-aqueous liquids such as one or more optional organic solvents), alternatively from about 1 wt. % to about 50 wt. %, alternatively from about 1 wt. % to about 20 wt. %, or alternatively from about 1 wt. % to about 10 wt. %. In an aspect of the present disclosure, the reaction media formed during one or more contacting steps performed during preparation of the olefin polymerization catalyst (e.g., the liquid components of a mixture comprising the titanated support, the liquid components of a mixture comprising the chrominated support, the liquid components of a mixture comprising the pre-catalyst, etc.) may contain greater than about 1 wt. % water, alternatively greater than about 5 wt. %, alternatively greater than about 10 wt. %, alternatively greater than about 20 wt. %, alternatively greater than about 30 wt. %, alternatively greater than about 40 wt. %, alternatively greater than about 50 wt. %, alternatively greater than about 60 wt. %, alternatively greater than about 70 wt. %, alternatively greater than about 80 wt. %, or alternatively greater than about 90 wt. % water based on the total weight of the reaction media, where the water may originate from one or more components used to form the mixture.

In the presently disclosed aspects, the solubility of the titanium may be sufficient to allow the titanium-containing solution to be contacted with the support material (e.g., silica-support, chrominated silica-support) using techniques such as spray drying. Spray drying as used herein refers to a method of producing a dry powder from a liquid or slurry by rapidly drying with a hot gas. Such methodologies may be advantageously utilized in the preparation of catalysts having a consistent particle sized distribution.

In any aspect of the present disclosure, the pre-catalyst (e.g., a chrominated, titanated support) formed may be dried. For example, the pre-catalyst may be dried at temperatures ranging from about 25° C. to about 300° C., alternatively from about 50° C. to about 200° C., or alternatively from about 80° C. to about 150° C. to form a dried pre-catalyst. The dried pre-catalyst may then be activated via a calcination step by heating in an oxidizing environment to produce the olefin polymerization catalyst. For example, the dried pre-catalyst may be calcined in the presence of air at a temperature in the range of from about 400° C. to about 1,000° C., alternatively from about 500° C. to about 900° C., or alternatively from about 500° C. to about 850° C. and for a time period of from about 1 min to about 24 hours, alternatively from about 1 minute to about 10 hours, alternatively from about 1 hour to about 24 hours, alternatively from about 1 hour to about 12 hours, alternatively from about 3 hours to about 12 hours, alternatively from about 20 min to about 5 hours, or alternatively from about 1 hour to about 3 hours to produce the olefin polymerization catalyst.

The olefin polymerization catalysts of the present disclosure are suitable for use in any olefin polymerization method, using various types of polymerization reactors. In an aspect of the present disclosure, a polymer of the present disclosure is produced by any olefin polymerization method, using various types of polymerization reactors. As used herein, "polymerization reactor" includes any reactor capable of polymerizing olefin monomers to produce homopolymers and/or copolymers. Homopolymers and/or copolymers produced in the reactor may be referred to as resin and/or polymers. The various types of reactors include, but are not limited to those that may be referred to as batch, slurry, gas-phase, solution, high pressure, tubular, autoclave, or other reactor and/or reactors. Gas phase reactors may comprise fluidized bed reactors or staged horizontal reactors. Slurry reactors may comprise vertical and/or horizontal loops. High pressure reactors may comprise autoclave and/or tubular reactors. Reactor types may include batch and/or continuous processes. Continuous processes may use intermittent and/or continuous product discharge or transfer. Processes may also include partial or full direct recycle of un-reacted monomer, un-reacted comonomer, catalyst and/or co-catalysts, diluents, and/or other materials of the polymerization process.

Polymerization reactor systems of the present disclosure may comprise one type of reactor in a system or multiple reactors of the same or different type, operated in any suitable configuration. Production of polymers in multiple reactors may include several stages in at least two separate polymerization reactors interconnected by a transfer system making it possible to transfer the polymers resulting from the first polymerization reactor into the second reactor. Alternatively, polymerization in multiple reactors may include the transfer, either manual or automatic, of polymer from one reactor to subsequent reactor or reactors for additional polymerization. Alternatively, multi-stage or multi-step polymerization may take place in a single reactor, wherein the conditions are changed such that a different polymerization reaction takes place.

The desired polymerization conditions in one of the reactors may be the same as or different from the operating conditions of any other reactors involved in the overall process of producing the polymer of the present disclosure. Multiple reactor systems may include any combination including, but not limited to multiple loop reactors, multiple gas phase reactors, a combination of loop and gas phase reactors, multiple high pressure reactors or a combination of high pressure with loop and/or gas reactors. The multiple reactors may be operated in series or in parallel. In an aspect of the present disclosure, any arrangement and/or any combination of reactors may be employed to produce the polymer of the present disclosure.

According to one aspect of the present disclosure, the polymerization reactor system may comprise at least one loop slurry reactor. Such reactors are commonplace, and may comprise vertical or horizontal loops. Monomer, diluent, catalyst system, and optionally any comonomer may be continuously fed to a loop slurry reactor, where polymerization occurs. Generally, continuous processes may comprise the continuous introduction of a monomer, a catalyst, and/or a diluent into a polymerization reactor and the continuous removal from this reactor of a suspension comprising polymer particles and the diluent. Reactor effluent may be flashed to remove the liquids that comprise the diluent from the solid polymer, monomer and/or comonomer. Various technologies may be used for this separation step including but not limited to, flashing that may include any combination of heat addition and pressure reduction; separation by cyclonic action in either a cyclone or hydrocyclone; separation by centrifugation; or other appropriate method of separation.

Typical slurry polymerization processes (also known as particle-form processes) are disclosed in U.S. Pat. Nos.

3,248,179, 4,501,885, 5,565,175, 5,575,979, 6,239,235, 6,262,191 and 6,833,415, for example; each of which are herein incorporated by reference in their entirety.

Suitable diluents used in slurry polymerization include, but are not limited to, the monomer being polymerized and hydrocarbons that are liquids under reaction conditions. Examples of suitable diluents include, but are not limited to, hydrocarbons such as propane, cyclohexane, isobutane, n-butane, n-pentane, isopentane, neopentane, and n-hexane. Some loop polymerization reactions can occur under bulk conditions where no diluent is used. An example is polymerization of propylene monomer as disclosed in U.S. Pat. No. 5,455,314, which is incorporated by reference herein in its entirety.

According to yet another aspect of the present disclosure, the polymerization reactor may comprise at least one gas phase reactor. Such systems may employ a continuous recycle stream containing one or more monomers continuously cycled through a fluidized bed in the presence of the catalyst under polymerization conditions. A recycle stream may be withdrawn from the fluidized bed and recycled back into the reactor. Simultaneously, polymer product may be withdrawn from the reactor and new or fresh monomer may be added to replace the polymerized monomer. Such gas phase reactors may comprise a process for multi-step gas-phase polymerization of olefins, in which olefins are polymerized in the gaseous phase in at least two independent gas-phase polymerization zones while feeding a catalyst-containing polymer formed in a first polymerization zone to a second polymerization zone. One type of gas phase reactor is disclosed in U.S. Pat. Nos. 4,588,790, 5,352,749, and 5,436,304, each of which is incorporated by reference in its entirety herein.

According to still another aspect of the present disclosure, a high pressure polymerization reactor may comprise a tubular reactor or an autoclave reactor. Tubular reactors may have several zones where fresh monomer, initiators, or catalysts are added. Monomer may be entrained in an inert gaseous stream and introduced at one zone of the reactor. Initiators, catalysts, and/or catalyst components may be entrained in a gaseous stream and introduced at another zone of the reactor. The gas streams may be intermixed for polymerization. Heat and pressure may be employed appropriately to obtain optimal polymerization reaction conditions.

According to yet another aspect of the present disclosure, the polymerization reactor may comprise a solution polymerization reactor wherein the monomer is contacted with the catalyst composition by suitable stirring or other means. A carrier comprising an organic diluent or excess monomer may be employed. If desired, the monomer may be brought in the vapor phase into contact with the catalytic reaction product, in the presence or absence of liquid material. The polymerization zone is maintained at temperatures and pressures that will result in the formation of a solution of the polymer in a reaction medium. Agitation may be employed to obtain better temperature control and to maintain uniform polymerization mixtures throughout the polymerization zone. Adequate means are utilized for dissipating the exothermic heat of polymerization.

Polymerization reactors suitable for the present disclosure may further comprise any combination of at least one raw material feed system, at least one feed system for catalyst or catalyst components, and/or at least one polymer recovery system. Suitable reactor systems for the present invention may further comprise systems for feedstock purification, catalyst storage and preparation, extrusion, reactor cooling, polymer recovery, fractionation, recycle, storage, loadout, laboratory analysis, and process control.

Conditions that are controlled for polymerization efficiency and to provide polymer properties include, but are not limited to temperature, pressure, type and quantity of catalyst or co-catalyst, and the concentrations of various reactants. Polymerization temperature can affect catalyst productivity, polymer molecular weight and molecular weight distribution. Suitable polymerization temperatures may be any temperature below the de-polymerization temperature, according to the Gibbs Free Energy Equation. Typically, this includes from about 60° C. to about 280° C., for example, and/or from about 70° C. to about 110° C., depending upon the type of polymerization reactor and/or polymerization process.

Suitable pressures will also vary according to the reactor and polymerization process. The pressure for liquid phase polymerization in a loop reactor is typically less than 1000 psig (6.9 MPa). Pressure for gas phase polymerization is usually at about 200 psig (1.4 MPa)-500 psig (3.45 MPa). High pressure polymerization in tubular or autoclave reactors is generally run at about 20,000 psig (138 MPa); to 75,000 psig (518 MPa). Polymerization reactors can also be operated in a supercritical region occurring at generally higher temperatures and pressures. Operation above the critical point of a pressure/temperature diagram (supercritical phase) may offer advantages.

The concentration of various reactants can be controlled to produce polymers with certain physical and mechanical properties. The proposed end-use product that will be formed by the polymer and the method of forming that product may be varied to determine the desired final product properties. Mechanical properties include, but are not limited to tensile strength, flexural modulus, impact resistance, creep, stress relaxation and hardness tests. Physical properties include, but are not limited to density, molecular weight, molecular weight distribution, melting temperature, glass transition temperature, temperature melt of crystallization, density, stereoregularity, crack growth, short chain branching, long chain branching and rheological measurements.

The concentrations of monomer, comonomer, hydrogen, co-catalyst, modifiers, and electron donors are generally important in producing specific polymer properties. Comonomer may be used to control product density. Hydrogen may be used to control product molecular weight. Co-catalysts may be used to alkylate, scavenge poisons and/or control molecular weight. The concentration of poisons may be minimized, as poisons may impact the reactions and/or otherwise affect polymer product properties. Modifiers may be used to control product properties and electron donors may affect stereoregularity.

Polymers such as polyethylene homopolymers and copolymers of ethylene with other mono-olefins may be produced in the manner described above using the polymerization catalysts prepared as described herein. Polymers produced as disclosed herein may be formed into articles of manufacture or end use articles using techniques known in the art such as extrusion, blow molding, injection molding, fiber spinning, thermoforming, and casting. For example, a polymer resin may be extruded into a sheet, which is then thermoformed into an end use article such as a container, a cup, a tray, a pallet, a toy, or a component of another product. Examples of other end use articles into which the polymer resins may be formed include pipes, films, and bottles.

A method of the present disclosure comprises contacting an olefin polymerization catalyst of the type described with an olefin under conditions suitable for the formation of a polyolefin and recovering the polyolefin. In an aspect the olefin is ethylene and the polyolefin is polyethylene.

Polyethylene prepared as described herein may be characterized by a high load melt index (HLMI), ranging from about 1 g/10 min. to about 1000 g/10 min.; alternatively, from about 3 g/10 min. to about 300 g/10 min.; alternatively, from about 6 g/10 min. to about 20 g/10 min.; or alternatively, from about 9 g/10 min to about 14 g/10 min. In a further aspect, the polyethylene prepared as described herein may be characterized by a high load melt index that is from about 1.5 to about 2.5 times greater than the high load melt index of a polymer produced by utilizing an otherwise similar catalyst produced in the absence of a titanium ligand. The HLMI represents the rate of flow of a molten polymer through an orifice of 0.0825 inch diameter when subjected to a force of 21,600 grams at 190° C. as determined in accordance with ASTM D1238-82 condition F.

EXAMPLES

The following examples are given as particular aspects of the present disclosure and to demonstrate the practice and advantages thereof. It is understood that the examples are given by way of illustration and are not intended to limit the specification or the claims to follow in any manner.

Example 1

In the following experiments, the solvating agents listed in Table 1 were investigated by dissolving in the solvent system as listed to form a solution. Ti(OiPr)$_4$ was then added and dissolution was attempted in order to form a titanium solution. A pre-catalyst was prepared by depositing the titanium-cation solution onto a chrominated silica-support (HW30A, W. R. Grace and Company). The pre-catalyst was then dried and calcined in air for three hours at 650° C. prior to use in polymerization experiments. HW30A, the solvating agents and solvents were used as received and were not dried prior to use.

Polymerization tests were conducted in a 2.2 liter stainless-steel reactor equipped with a marine stirrer rotating at 500 rpm. The reactor was surrounded by a steel jacket, through which a mixture of cold water and steam was passed to precisely control the temperature to within half a degree centigrade, with the aid of electronic control instruments.

Unless otherwise stated, a small amount (0.01 to 0.10 grams normally) of the solid catalyst prepared as described herein was first charged under nitrogen to the dry reactor. Next 1.2 liter of isobutane liquid was charged and the reactor and heated to 105° C. Finally ethylene was added to the reactor to maintain a fixed pressure, 550 psig (3.8 MPa), during the experiment. The mixture was stirred continuously for the specified time, usually around one hour, and the activity was noted by recording the flow of ethylene into the reactor to maintain the set pressure.

After the allotted time, the ethylene flow was stopped and the reactor slowly depressurized and opened to recover a granular polymer powder. In all cases the reactor was clean with no indication of any wall scale, coating or other forms of fouling. The polymer powder was then removed and weighed. Activity was specified as grams of polymer produced per gram of solid catalyst charged per hour.

The results of polymerization runs are shown in Table 1. The table lists each solvating agent and solvent system along with various polymer properties including high load melt index and $I_{10}$ melt index. $I_{10}$ melt index (g/10 min) is the polymer flow rate using a 10 kg weight and was determined in accordance with ASTM D1238 at 190° C. with a 10 kg weight. The high load melt index (HLMI) represents the rate of flow of a molten resin through an orifice of 0.0825 inch diameter when subjected to a force of 21,600 grams at 190° C. The HLMI values were determined in accordance with ASTM D1238-82 condition F.

Comparative run CM-1 used no titanium and provided baseline levels for the catalyst productivity, activity, and melt index values for the resultant polymer. The melt index values $I_{10}$ and HLMI indicate the extent of titanation upon the silica-support where higher melt index values indicate more effective (i.e., greater), titanation. Comparative runs CM-2 and CM-3 used no solvating agent: the lack of improvement in HLMI and/or $I_{10}$ indicate that effective titanation was not achieved with an alcohol solvent or a water solvent. Comparative runs CM-4, CM-5, CM-6, CM-7, & CM-12 used a water solvent and none of the potential solvating agents tested displayed effective titanation. Comparative runs CM-8-CM-11 used a water solvent and none of the potential solvating agents tested were capable of dissolving the Ti(IV) reagent. Comparative runs CM-13 & CM-14 used a mixed solvent system with 2 equivalents ascorbic acid but did not provide effective titanation. The polymers produced using the catalysts of the present disclosure, runs IN-1 & IN-2, displayed highly effective titanation using 4 equivalents ascorbic acid as the solvating agent in either a water solvent or an alcohol solvent.

TABLE 1

| Run No. | Wt. % Ti | Solvating Agent (SA) | Molar Equiv. SA/Ti | Solvent | Productivity g PE/g catalyst | Activity g PE/g-h | HLMI g/10 min | $I_{10}$ g/10 min |
|---|---|---|---|---|---|---|---|---|
| CM-1 | 0 | None | — | None | 2973 | 2973 | 5.5 | 0.87 |
| CM-2 | 3.5* | None | — | Water | 2488 | 2650 | 5.2 | 0.80 |
| CM-3 | 3.5 | None | — | n-PrOH | 2765 | 2614 | 6.1 | 0.98 |
| CM-4 | 3.5 | Glycolic acid | 4 | Water | 3098 | 3320 | 5.7 | 0.97 |
| CM-5 | 3.5 | Glyoxilic acid | 2 | Water | 2186 | 2851 | 2.9 | 0.37 |
| CM-6 | 3.5 | HNO$_3$ | 1 | Water | 2846 | 2339 | 1.1 | 0.08 |
| CM-7 | 3.5 | Phosphono-acetic acid | 2 | Water | 867 | 627 | 6.0 | 1.14 |
| CM-8 | 3.5 | Malic acid | 4 | Water | Ti would not dissolve | | — | — |
| CM-9 | 3.5 | Malonic acid | 4 | Water | Ti would not dissolve | | — | — |
| CM-10 | 3.5 | Maleic acid | 4 | Water | Ti would not dissolve | | — | — |
| CM-11 | 3.5 | Aspartic acid | 3 | Water | Ti would not dissolve | | — | — |
| CM-12 | 3.5 | Citric acid | 3 | Water | 2303 | 2607 | 3.9 | 0.48 |
| CM-13 | 3.5 | Ascorbic acid | 2 | 9/1 nPrOH/water (v/v) | 3236 | 3034 | 4.6 | 0.76 |

TABLE 1-continued

| Run No. | Wt. % Ti | Solvating Agent (SA) | Molar Equiv. SA/Ti | Solvent | Productivity g PE/g catalyst | Activity g PE/g-h | HLMI g/10 min | $I_{10}$ g/10 min |
|---|---|---|---|---|---|---|---|---|
| CM-14 | 3.5 | Ascorbic acid | 2 | 2/1 nPrOH/water (v/v) | 3258 | 2874 | 6.2 | 1.07 |
| IN-1 | 3.5 | Ascorbic acid | 4 | Water | 2927 | 3444 | 12.8 | 2.53 |
| IN-2 | 3.5 | Ascorbic acid | 4 | MeOH | 3635 | 2167 | 9.6 | 1.84 |

*indicates $TiO_2$ precipitated out of solution

Additional Disclosure

The following enumerated aspects of the present disclosures are provided as non-limiting examples.

Aspect A

A first aspect which is a method of preparing a catalyst comprising: a) contacting a titanium-containing compound, a solvating agent, and a solvent to form a solution; b) contacting the solution with a chrominated silica-support to form a pre-catalyst; and c) thermally treating the pre-catalyst by heating to a temperature of from about 400° C. to about 1000° C. for a time period of from about 1 minute to about 24 hours to form the catalyst.

A second aspect which is the method of the first aspect, wherein the solvating agent comprises a β-hydroxy-α,β-unsaturated carbonyl-containing compound, an α,β-dihydroxy-α,β-unsaturated carbonyl-containing compound, or a combination thereof.

A third aspect which is the method of any of the first through second aspects wherein the solvating agent has Structure CS 1, Structure CS 2, Structure CS 3, Structure CS 4, Structure CS 5, or Structure CS 6

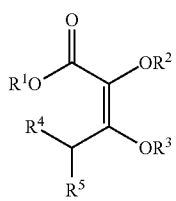

CS 1

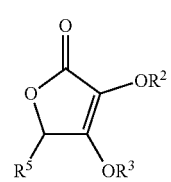

CS 2

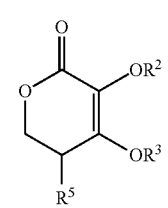

CS 3

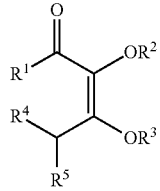

CS 4

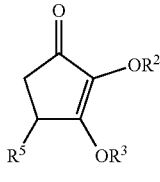

CS 5

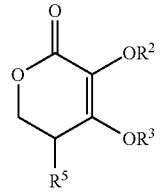

CS 6 wherein $R^1$ is a $C_1$ to $C_{12}$ organyl group or a $C_6$ to $C_{12}$ aryl group, $R^2$ and $R^3$ are each independently hydrogen, —$CH_2OCH_3$, —$CH_2SCH_3$, or $SiY_3$, $R^4$ is —OH, —$OCH_2OCH_3$, —$OCH_2SCH_3$, —$OSiY_3$, hydrogen, a $C_2$ to $C_{12}$ organyl group, or a $C_6$ to $C_{12}$ aryl group, $R^5$ is —CH($OR^6$)$CH_2OR^7$, —OH, —$OCH_2OCH_3$, —$OCH_2SCH_3$, —$OSiY_3$, hydrogen, a $C_2$ to $C_{12}$ organyl group, or a $C_6$ to $C_{12}$ aryl group, $R^6$ and $R^7$ are each independently hydrogen, —$CH_2OCH_3$, —$CH_2SCH_3$, or $SiY_3$, and Y is methyl, isopropyl, tert-butyl or a combination thereof.

A fourth aspect which is the method of the third aspect wherein the solvating agent comprises ascorbic acid, L-ascorbic acid, D-ascorbic acid, L-isoascorbic acid, D-isoascorbic acid, D-erythorbic acid, oxytetronic acid, reductic acid or a combination thereof.

A fifth aspect which is the method of any of the first through fourth aspects wherein the titanium-containing compound comprises a titanium tetraalkoxide.

A sixth aspect which is the method of the fifth aspect wherein the titanium tetraalkoxide comprises titanium n-propoxide, titanium n-butoxide, titanium isopropoxide or a combination thereof.

A seventh aspect which is the method of any of the first through sixth aspects wherein a weight ratio of solvating agent to silica comprising the chrominated silica-support is from about 0.5:1 to about 10:1.

An eighth aspect which is the method of any of the first through seventh aspects wherein the solvent is an aqueous solvent, a nonaqueous solvent, an alcohol or a combination thereof.

A ninth aspect which is the method of any of the first through eighth aspects wherein the chrominated silica-support is characterized by a surface area of from about 100 m²/gram to about 1000 m²/gram and a pore volume of from about 1.0 cm³/gram to about 2.5 cm³/gram.

A tenth aspect which is the method of any of the first through ninth aspects wherein an amount of chromium present in the catalyst may range from about 0.01% to about 10% by weight of the catalyst and an amount of titanium present in the catalyst may range from about 0.01% to about 10% by weight of the catalyst.

An eleventh aspect which is the method of any of the first through tenth aspects wherein the chrominated silica-support is a not thermally treated prior to contacting with the solution.

A twelfth aspect which is a method of forming a polymer comprising contacting the catalyst of the first aspect with a monomer under conditions suitable for formation of a polymer and recovering the polymer.

A thirteenth aspect which is the method of the twelfth aspect wherein the monomer comprises an ethylene monomer and the polymer comprises an ethylene polymer.

A fourteenth aspect which is the method of any of the twelfth through thirteenth aspects wherein the polymer has a high load melt index that is from about 1.5 to about 2.5 times greater than the high load melt index of a polymer produced by utilizing an otherwise similar catalyst produced in the absence of a solvating agent.

A fifteenth aspect which is the a method of preparing a catalyst comprising: a) contacting a titanium-containing compound, a solvating agent, and a solvent to form a solution; b) contacting the solution with a silica-support to form a titanated support; c) contacting the titanated support with a chromium-containing compound to form a pre-catalyst; and d) thermally treating the pre-catalyst by heating to a temperature of from about 400° C. to about 1000° C. for a time period of from about 1 minute to about 24 hours to form the catalyst.

A sixteenth aspect which is the method of the fifteenth aspect wherein the solvating agent comprises ascorbic acid, L-ascorbic acid, D-ascorbic acid, L-isoascorbic acid, D-isoascorbic acid, D-erythorbic acid, oxytetronic acid, reductic acid or a combination thereof.

A seventeenth aspect which is the method of any of the fifteenth through sixteenth aspects wherein the titanium-containing compound comprises a titanium tetraalkoxide.

An eighteenth aspect which is the method of any of the fifteenth through seventeenth aspects wherein a weight ratio of solvating agent to silica comprising the silica-support is from about 0.5:1 to about 10:1.

A nineteenth aspect which is the method of any of the fifteenth through eighteenth aspects wherein the solvent is an aqueous solvent, a nonaqueous solvent, an alcohol or a combination thereof.

A twentieth aspect which is the method of any of the fifteenth through nineteenth aspects wherein the chromium-containing compound comprises chromium trioxide, chromium acetate, chromium nitrate, tertiary butyl chromate, a diarene chromium (0) compound, biscyclopentadienyl chromium(II), chromium (III) acetylacetonate, or a combination thereof.

A twenty-first aspect which is the method of any of the fifteenth through twentieth aspects wherein the silica-support is not thermally treated prior to contacting with the solution.

A twenty-second aspect which is a method of preparing a catalyst comprising: a) contacting a titanium-containing compound, a solvating agent, and a solvent to form a solution; b) contacting a silica-support, a chromium-containing compound and the solution to form a pre-catalyst; and c) thermally treating the pre-catalyst by heating to a temperature of from about 400° C. to about 1000° C. for a time period of from about 1 minute to about 24 hours to form the catalyst.

A twenty-third aspect which is a method of preparing a catalyst comprising: a) contacting a titanium-containing compound, a solvating agent, and a solvent to form a solution; b) contacting a silica-support and a chromium-containing compound to form a chrominated support; c) contacting the solution of step (a) with the chrominated support of step (b) to form a pre-catalyst; and d) thermally treating the pre-catalyst by heating to a temperature of from about 400° C. to about 1000° C. for a time period of from about 1 minute to about 24 hours to form the catalyst.

A twenty-fourth aspect which is a method of preparing a catalyst comprising: a) contacting a silica-support, a chromium-containing compound, a titanium-containing compound, a solvating agent, and a solvent to form a pre-catalyst; and b) thermally treating the pre-catalyst by heating to a temperature of from about 400° C. to about 1000° C. for a time period of from about 1 minute to about 24 hours to form the catalyst.

A twenty-fifth aspect which is a method of preparing a catalyst comprising: a) contacting Ti(OiPr)$_4$, water, and ascorbic acid to form a solution; b) contacting the solution with a chrominated silica-support to form a pre-catalyst; and c) thermally treating the pre-catalyst by heating to a temperature of from about 400° C. to about 1000° C. for a time period of from about 1 minute to about 24 hours to form the catalyst.

Aspect B

A first aspect which is a method of preparing a pre-catalyst comprising a) contacting a titanium-containing compound, a solvating agent, and a solvent to form a solution, wherein the solvating agent comprises a β-hydroxy-α,β-unsaturated carbonyl-containing compound, an α,β-dihydroxy-α,β-unsaturated carbonyl-containing compound, or a combination thereof, and b) contacting the solution with a chrominated silica-support to form the pre-catalyst.

A second aspect which is the method of the first aspect wherein the solvating agent has Structure CS 1, Structure CS 2, Structure CS 3, Structure CS 4, Structure CS 5, or Structure CS 6

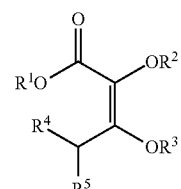

CS 1

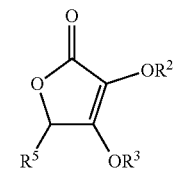

CS 2

-continued

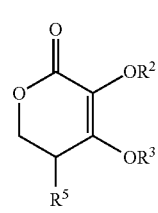
CS 3

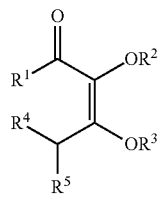
CS 4

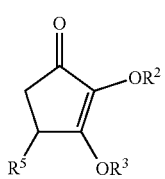
CS 5

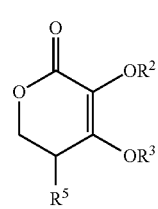
CS 6 wherein
$R^1$ is a $C_1$ to $C_{12}$ organyl group or a $C_6$ to $C_{12}$ aryl group,
$R^2$ and $R^3$ are each independently be hydrogen, —$CH_2OCH_3$, —$CH_2SCH_3$, or $SiY_3$,
$R^4$ is —OH, —$OCH_2OCH_3$, —$OCH_2SCH_3$, —$OSiY_3$, hydrogen, a $C_2$ to $C_{12}$ organyl group, or a $C_6$ to $C_{12}$ aryl group,
$R^5$ is —$CH(OR^6)CH_2OR^7$, —OH, —$OCH_2OCH_3$, —$OCH_2SCH_3$, —$OSiY_3$, hydrogen, a $C_2$ to $C_{12}$ organyl group, or a $C_6$ to $C_{12}$ aryl group,
$R^6$ and $R^7$ are each independently be hydrogen, —$CH_2OCH_3$, —$CH_2SCH_3$, or $SiY_3$, and
Y is methyl, isopropyl, t-butyl or a combination thereof.

A third aspect which is the method of any of the first and the second aspects wherein the solvating agent comprises ascorbic acid, L-ascorbic acid, D-ascorbic acid, L-isoascorbic acid, D-isoascorbic acid, D-erythorbic acid, oxytetronic acid, reductic acid or a combination thereof.

A fourth aspect which is the method of any of the first through the third aspects wherein the titanium-containing compound comprises a titanium tetraalkoxide.

A fifth aspect which is the method of the fourth aspect wherein the titanium tetraalkoxide comprises titanium n-propoxide, titanium n-butoxide, titanium isopropoxide or a combination thereof.

A sixth aspect which is the method of any of the first through the fifth aspects wherein a weight ratio of solvating agent to silica of the chrominated silica-support is from about 0.5:1 to about 10:1.

A seventh aspect which is the method of any of the first through the sixth aspects wherein the solvent is an aqueous solvent, a nonaqueous solvent, an alcohol or a combination thereof.

An eighth aspect which is the method of any of the first through the seventh aspects wherein the chrominated silica-support is characterized by a surface area of from about 100 $m^2$/gram to about 1000 $m^2$/gram and a pore volume of from about 1.0 $cm^3$/gram to about 2.5 $cm^3$/gram.

A ninth aspect which is the method of any of the first through the eighth aspects wherein the chrominated silica-support is not thermally treated prior to contacting with the solution.

A tenth aspect which is a method of preparing a pre-catalyst comprising a) contacting a titanium-containing compound, a solvating agent, and a solvent to form a solution, wherein the solvating agent comprises a β-hydroxy-α,β-unsaturated carbonyl-containing compound, an α,β-dihydroxy-α,β-unsaturated carbonyl-containing compound, or a combination thereof, b) contacting the solution with a silica-support to form a titanated support, and c) contacting the titanated support with a chromium-containing compound to form the pre-catalyst.

An eleventh aspect which is the method of the tenth aspect wherein the solvating agent has Structure CS 1, Structure CS 2, Structure CS 3, Structure CS 4, Structure CS 5, or Structure CS 6

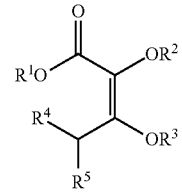
CS 1

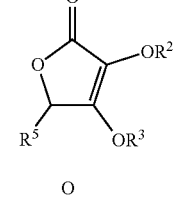
CS 2

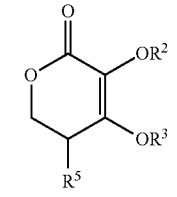
CS 3

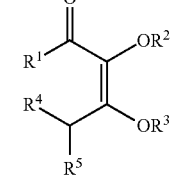
CS 4

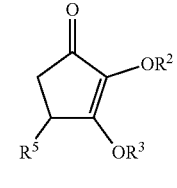
CS 5

-continued

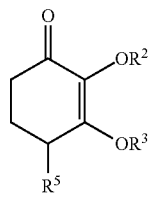

CS 6 wherein
R$^1$ is a C$_1$ to C$_{12}$ organyl group or a C$_6$ to C$_{12}$ aryl group,
R$^2$ and R$^3$ are each independently be hydrogen, —CH$_2$OCH$_3$, —CH$_2$SCH$_3$, or SiY$_3$,
R$^4$ is —OH, —OCH$_2$OCH$_3$, —OCH$_2$SCH$_3$, —OSiY$_3$, hydrogen, a C$_2$ to C$_{12}$ organyl group, or a C$_6$ to C$_{12}$ aryl group,
R$^5$ is —CH(OR$^6$)CH$_2$OR$^7$, —OH, —OCH$_2$OCH$_3$, —OCH$_2$SCH$_3$, —OSiY$_3$, hydrogen, a C$_2$ to C$_{12}$ organyl group, or a C$_6$ to C$_{12}$ aryl group,
R$^6$ and R$^7$ are each independently be hydrogen, —CH$_2$OCH$_3$, —CH$_2$SCH$_3$, or SiY$_3$, and Y is methyl, isopropyl, t-butyl or a combination thereof.

A twelfth aspect which is the method of any of the tenth and the eleventh aspects wherein the solvating agent comprises ascorbic acid, L-ascorbic acid, D-ascorbic acid, L-isoascorbic acid, D-isoascorbic acid, D-erythorbic acid, oxytetronic acid, reductic acid or a combination thereof.

A thirteenth aspect which is the method of any of the tenth through the twelfth aspects wherein the titanium-containing compound comprises a titanium tetraalkoxide.

A fourteenth aspect which is the method of any of the tenth through the thirteenth aspects wherein a weight ratio of solvating agent to silica comprising the silica-support is from about 0.5:1 to about 10:1.

A fifteenth aspect which is the method of any of the tenth through the fourteenth aspects wherein the solvent is an aqueous solvent, a nonaqueous solvent, an alcohol or a combination thereof.

A sixteenth aspect which is the method of any of the tenth through the fifteenth aspects wherein the chromium-containing compound comprises chromium trioxide, chromium acetate, chromium nitrate, tertiary butyl chromate, a diarene chromium (0) compound, biscyclopentadienyl chromium (II), chromium (III) acetylacetonate, or a combination thereof.

A seventeenth aspect which is the method of any of the tenth through the sixteenth aspects wherein the silica-support is not thermally treated prior to contacting with the solution.

An eighteenth aspect which is a method of preparing a pre-catalyst comprising a) contacting a titanium-containing compound, a solvating agent, and a solvent to form a solution, wherein the solvating agent comprises a β-hydroxy-α,β-unsaturated carbonyl-containing compound, an α,β-dihydroxy-α,β-unsaturated carbonyl-containing compound, or a combination thereof, and b) contacting a silica support, a chromium-containing compound and the solution to form the pre-catalyst.

A nineteenth aspect which is the method of the seventeenth aspect wherein the solvating agent has Structure CS 1, Structure CS 2, Structure CS 3, Structure CS 4, Structure CS 5, or Structure CS 6

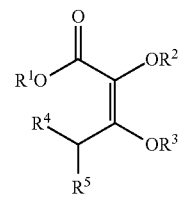

CS 1

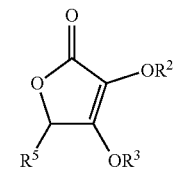

CS 2

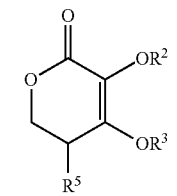

CS 3

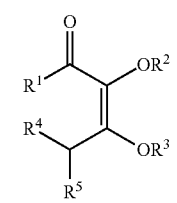

CS 4

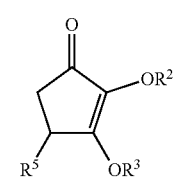

CS 5

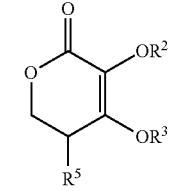

CS 6 wherein
R$^1$ is a C$_1$ to C$_{12}$ organyl group or a C$_6$ to C$_{12}$ aryl group,
R$^2$ and R$^3$ are each independently be hydrogen, —CH$_2$OCH$_3$, —CH$_2$SCH$_3$, or SiY$_3$,
R$^4$ is —OH, —OCH$_2$OCH$_3$, —OCH$_2$SCH$_3$, —OSiY$_3$, hydrogen, a C$_2$ to C$_{12}$ organyl group, or a C$_6$ to C$_{12}$ aryl group,
R$^5$ is —CH(OR$^6$)CH$_2$OR$^7$, —OH, —OCH$_2$OCH$_3$, —OCH$_2$SCH$_3$, —OSiY$_3$, hydrogen, a C$_2$ to C$_{12}$ organyl group, or a C$_6$ to C$_{12}$ aryl group,
R$^6$ and R$^7$ are each independently be hydrogen, —CH$_2$OCH$_3$, —CH$_2$SCH$_3$, or SiY$_3$, and
Y is methyl, isopropyl, t-butyl or a combination thereof.

A twentieth aspect which is the method of the eighteenth aspect wherein the solvating agent comprises ascorbic acid, L-ascorbic acid, D-ascorbic acid, L-isoascorbic acid, D-isoascorbic acid, D-erythorbic acid, oxytetronic acid, reductic acid or a combination thereof.

A twenty-first aspect which is a pre-catalyst composition comprising a) a titanium-containing compound, b) a solvating agent selected from the group consisting of a β-hydroxy-α,β-unsaturated carbonyl-containing compound, an α,β-dihydroxy-α,β-unsaturated carbonyl-containing compound, and a combination thereof, and c) a chrominated silica-support.

A twenty-second aspect which is the pre-catalyst of the twenty-first aspect wherein the solvating agent has Structure CS 1, Structure CS 2, Structure CS 3, Structure CS 4, Structure CS 5, or Structure CS 6

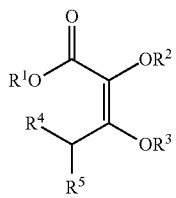
CS 1

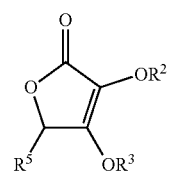
CS 2

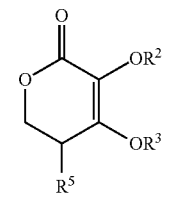
CS 3

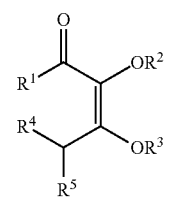
CS 4

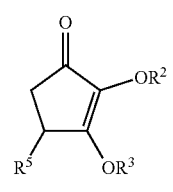
CS 5

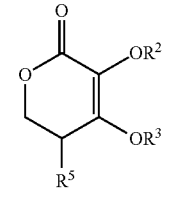
CS 6 wherein
$R^1$ is a $C_1$ to $C_{12}$ organyl group or a $C_6$ to $C_{12}$ aryl group,
$R^2$ and $R^3$ are each independently be hydrogen, —$CH_2OCH_3$, —$CH_2SCH_3$, or $SiY_3$,
$R^4$ is —OH, —$OCH_2OCH_3$, —$OCH_2SCH_3$, —$OSiY_3$, hydrogen, a $C_2$ to $C_{12}$ organyl group, or a $C_6$ to $C_{12}$ aryl group, $R^5$ is —$CH(OR^6)CH_2OR^7$, —OH, —$OCH_2OCH_3$, —$OCH_2SCH_3$, —$OSiY_3$, hydrogen, a $C_2$ to $C_{12}$ organyl group, or a $C_6$ to $C_{12}$ aryl group,
$R^6$ and $R^7$ are each independently be hydrogen, —$CH_2OCH_3$, —$CH_2SCH_3$, or $SiY_3$, and
Y is methyl, isopropyl, t-butyl or a combination thereof.

A twenty-third aspect which is the pre-catalyst of any of the twenty-first and the twenty-second aspects wherein the solvating agent comprises ascorbic acid, L-ascorbic acid, D-ascorbic acid, L-isoascorbic acid, D-isoascorbic acid, D-erythorbic acid, oxytetronic acid, reductic acid or a combination thereof.

A twenty-fourth aspect which is a titanated, chominated silica-support comprising a solvating agent selected from the group consisting of a β-hydroxy-α,β-unsaturated carbonyl-containing compound, an α,β-dihydroxy-α,β-unsaturated carbonyl-containing compound, and a combination thereof.

A twenty-fifth aspect which is the titanated, chominated silica-support of the twenty-fourth aspect wherein the solvating agent has Structure CS 1, Structure CS 2, Structure CS 3, Structure CS 4, Structure CS 5, or Structure CS 6

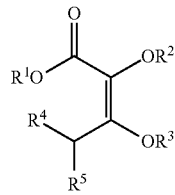
CS 1

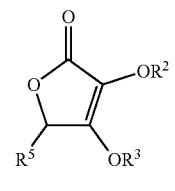
CS 2

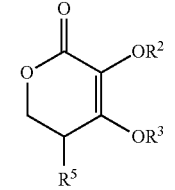
CS 3

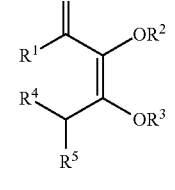
CS 4

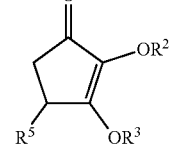
CS 5

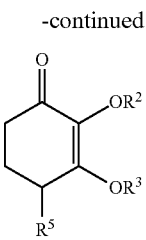

CS 6 wherein
R¹ is a $C_1$ to $C_{12}$ organyl group or a $C_6$ to $C_{12}$ aryl group,
R² and R³ are each independently be hydrogen, —CH₂OCH₃, —CH₂SCH₃, or SiY₃,
R⁴ is —OH, —OCH₂OCH₃, —OCH₂SCH₃, —OSiY₃, hydrogen, a $C_2$ to $C_{12}$ organyl group, or a $C_6$ to $C_{12}$ aryl group,
R⁵ is —CH(OR⁶)CH₂OR⁷, —OH, —OCH₂OCH₃, —OCH₂SCH₃, —OSiY₃, hydrogen, a $C_2$ to $C_{12}$ organyl group, or a $C_6$ to $C_{12}$ aryl group,
R⁶ and R⁷ are each independently be hydrogen, —CH₂OCH₃, —CH₂SCH₃, or SiY₃, and
Y is methyl, isopropyl, t-butyl or a combination thereof.
A twenty-sixth aspect which is the titanated, chominated silica-support of any of the twenty-fourth through the twenty-fifth aspects wherein the solvating agent comprises ascorbic acid, L-ascorbic acid, D-ascorbic acid, L-isoascorbic acid, D-isoascorbic acid, D-erythorbic acid, oxytetronic acid, reductic acid or a combination thereof.

While various aspects of the present disclosures have been shown and described, modifications thereof can be made by one skilled in the art without departing from the spirit and teachings of the invention. The aspects of the present disclosures described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an aspect of the present disclosure of the present invention. Thus, the claims are a further description and are an addition to the aspect of the present disclosures of the present disclosure. The discussion of a reference in the present disclosure is not an admission that it is prior art to the present disclosure, especially any reference that may have a publication date after the priority date of this application. The present disclosures of all patents, patent applications, and publications cited herein are hereby incorporated by reference, to the extent that they provide exemplary, procedural or other details supplementary to those set forth herein.

What is claimed is:

1. A method of preparing a pre-catalyst comprising:
   a) contacting (i) a titanium-containing compound, (ii) ascorbic acid or a derivative thereof and (iii) a solvent to form a solution;
   b) contacting the solution with a chromium-containing compound to form a mixture; and
   c) spray-drying a silica support with the mixture to form the pre-catalyst.

2. The method of claim 1 wherein the ascorbic acid comprises L-ascorbic acid, D-ascorbic acid, L-isoascorbic acid, D-isoascorbic acid, D-erythorbic acid or a combination thereof.

3. The method of claim 1 wherein a weight ratio of ascorbic acid or a derivative thereof to silica of the silica support is from about 0.5:1 to about 10:1.

4. The method of claim 1 wherein the titanium-containing compound provides an amount of titanium in the pre-catalyst of from about 0.01 wt. % to about 10 wt. % based on the weight of the pre-catalyst.

5. The method of claim 1 wherein the titanium-containing compound is characterized by a general formula Ti(OR¹)₂(acac)₂ wherein OR¹ is ethoxide, isopropoxide, n-propoxide, butoxide, or a combination thereof and "acac" is acetylacetonate.

6. The method of claim 1 wherein the titanium-containing compound is characterized by a general formula Ti(OR¹)₂(oxal) wherein OR¹ is ethoxide, isopropoxide, n-propoxide, butoxide, or a combination thereof and "oxal" is oxalate.

7. The method of claim 1 wherein the solvent is an aqueous solvent, a nonaqueous solvent, an alcohol or a combination thereof.

8. The method of claim 1 wherein the solvent is water.

9. The method of claim 1 wherein the chromium-containing compound comprises tertiary butyl chromate, a diarene chromium (0) compound, biscyclopentadienyl chromium (II), chromium carboxylates, chromium naphthenates, chromium halides, chromium sulfate, chromium nitrate, chromium dionates, or a combination thereof.

10. The method of claim 1 wherein the chromium-containing compound provides an amount of chromium in the pre-catalyst of from about 0.01 wt. % to about 10 wt. % based on the weight of the pre-catalyst.

11. A method of preparing a pre-catalyst comprising:
    a) contacting (i) a titanium-containing compound, (ii) ascorbic acid or a derivative thereof and (iii) a solvent to form a solution;
    b) contacting the solution with a chromium-containing compound to form a mixture; and
    c) impregnating a silica support with the mixture to form the pre-catalyst.

12. The method of claim 11 wherein the ascorbic acid comprises L-ascorbic acid, D-ascorbic acid, L-isoascorbic acid, D-isoascorbic acid, D-erythorbic acid or combinations thereof.

13. The method of claim 11 wherein a weight ratio of ascorbic acid or a derivative thereof to silica of the silica support is from about 0.5:1 to about 10:1.

14. The method of claim 11 wherein the titanium-containing compound provides an amount of titanium in the pre-catalyst of from about 0.01 wt. % to about 10 wt. % based on the weight of the pre-catalyst.

15. The method of claim 11 wherein the titanium-containing compound is characterized by a general formula Ti(OR¹)₂(acac)₂ wherein OR¹ is ethoxide, isopropoxide, n-propoxide, butoxide, or a combination thereof and "acac" is acetylacetonate.

16. The method of claim 11 wherein the titanium-containing compound is characterized by a general formula $Ti(OR^1)_2(oxal)$ wherein $OR^1$ is ethoxide, isopropoxide, n-propoxide, butoxide, or a combination thereof and "oxal" is oxalate.

17. The method of claim 11 wherein the solvent is water.

18. A pre-catalyst composition comprising:
a) a titanium-containing compound;
b) a silica support;
c) a chromium-containing compound;
d) a solvating agent wherein the solvating agent comprises ascorbic acid, L-ascorbic acid, D-ascorbic acid, L-isoascorbic acid, D-isoascorbic acid, D-erythorbic acid, oxytetronic acid, reductic acid or a combination thereof; and
e) a solvent.

19. The pre-catalyst composition of claim 18 wherein the titanium-containing compound comprises a titanium tetraalkoxide.

20. The pre-catalyst composition of claim 18 wherein a weight ratio of solvating agent to silica of the silica support is from about 0.5:1 to about 10:1.

* * * * *